UNITED STATES PATENT OFFICE.

FRANK A. von BRECHT, OF CLAYTON, MISSOURI.

PROCESS OF MAKING MEMBRANE FROM ANIMAL TISSUE.

1,235,947.     Specification of Letters Patent.     Patented Aug. 7, 1917.

No Drawing.     Application filed January 6, 1917.   Serial No. 141,063.

*To all whom it may concern:*

Be it known that I, FRANK A. von BRECHT, a citizen of the United States of America, residing at the city of Clayton, county of St. Louis, State of Missouri, have invented a certain new and useful Process of Making Membrane from Animal Tissue, of which the following is such a full, clear, and exact description as will enable any one skilled in the art to which it appertains to make and use the same.

Certain animal tissues and membranes, such as intestinal coverings and linings, bladders, weasands, stomach linings and the like, are particularly suitable for sausage casings and meat containers, having among other qualities, the characteristic of expanding and contracting with the contained meat. Considerable membrane obtainable from slaughtered animals, and which is otherwise suitable for the purposes mentioned, could not heretofore be used on account of its size, shape or thickness.

I have discovered that by soaking such tissues in water or other liquid until they are soft and swollen and then thoroughly crushing them by mechanical means, a pulp will be formed, which, when pressed into sheets, will have approximately the appearance of the tissue heretofore used for sausage casings and the like, and other desirable qualities of such tissue. These sheets can be formed into sausage casings, meat containers, gold-beaters' skins, and like articles of any desired shape and size by winding them on a mandrel, sewing, pasting, cutting, or in any other suitable manner. The process therefore makes possible the utilization of torn intestinal coverings and other tissues, which have heretofore been wasted.

Having fully described my invention, what I claim as new and desire to secure by Letters Patent of the United States is:—

1. The process of forming a membrane from animal tissue, which comprises reducing the tissue to a pulp by mechanical means, and forming such pulp into sheets.

2. The process of forming membrane from animal tissue, which comprises soaking said tissue in a liquid, reducing same to a pulp by mechanical means, and pressing the pulp into sheets.

In testimony whereof, I have hereunto set my hand and affixed my seal in the presence of the two subscribing witnesses.

FRANK A. von BRECHT. [L. S.]

Witnesses:
    EDWIN B. SCHABERG,
    M. McDERMOTT.